United States Patent
Crocker et al.

(10) Patent No.: US 7,684,825 B2
(45) Date of Patent: *Mar. 23, 2010

(54) METHOD AND SYSTEM FOR MODEM PROTOCOL DISCRIMINATION

(75) Inventors: Dwayne Crocker, Oxford, MI (US); Ronald W. Fraser, Lake Orion, MI (US)

(73) Assignee: General Motors LLC, Detroit, MI (US)

( * ) Notice: Subject to any disclaimer, the term of this patent is extended or adjusted under 35 U.S.C. 154(b) by 124 days.

This patent is subject to a terminal disclaimer.

(21) Appl. No.: 11/744,397

(22) Filed: May 4, 2007

(65) Prior Publication Data

US 2007/0207835 A1 Sep. 6, 2007

Related U.S. Application Data

(63) Continuation of application No. 10/061,406, filed on Jan. 31, 2002, now Pat. No. 7,224,998.

(51) Int. Cl.
*H04B 1/38* (2006.01)

(52) U.S. Cl. .................. 455/557; 455/555; 455/426.1; 370/352; 375/222; 375/254

(58) Field of Classification Search .................. 375/222, 375/254; 455/557, 555, 426.1; 370/352
See application file for complete search history.

(56) References Cited

U.S. PATENT DOCUMENTS

| | | | |
|---|---|---|---|
| 5,999,526 A | 12/1999 | Garland et al. |
| 6,097,966 A | 8/2000 | Hanley |
| 6,230,010 B1 | 5/2001 | Morris |
| 6,263,268 B1 | 7/2001 | Nathanson |
| 6,393,031 B1 | 5/2002 | Isomura |
| 6,421,376 B1 | 7/2002 | Williams et al. |
| 6,480,533 B1 | 11/2002 | Chu et al. |
| 2004/0047407 A1 | 3/2004 | Fisher et al. |

*Primary Examiner*—Patrick N Edouard
*Assistant Examiner*—Wayne Cai
(74) *Attorney, Agent, or Firm*—Dierker & Associates, P.C.

(57) ABSTRACT

The invention provides a method of selecting a modem carrier type for data transmission over a wireless communication system. An incoming call is received from a mobile vehicle and then an initial carrier tone is sent to a mobile vehicle in response to the incoming call. A modem response signal is received from a vehicle modem in response to the initial carrier tone. The modem response signal is determined to be either an analog modem response signal or a digital modem response signal, and then the call is connected to either the analog modem or digital modem based on the modem response signal determination.

13 Claims, 3 Drawing Sheets

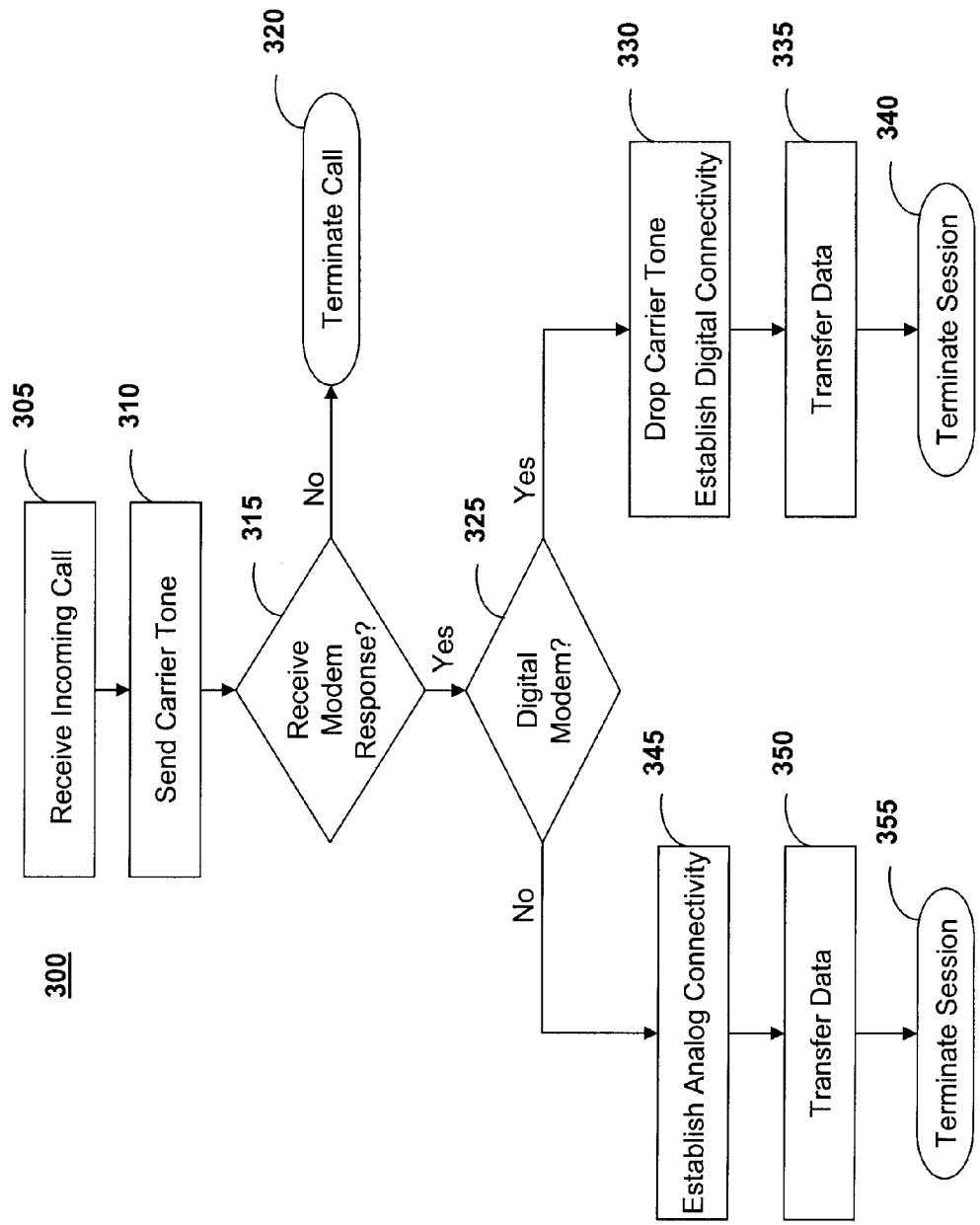

METHOD AND SYSTEM FOR MODEM PROTOCOL DISCRIMINATION

CROSS REFERENCE TO RELATED APPLICATION

This application is a continuation of U.S. patent application Ser. No. 10/061,406 filed on Jan. 31, 2002 now U.S. Pat. No. 7,224,998, which is incorporated herein by reference in its entirety.

TECHNICAL FIELD

This invention relates generally to data transmission over a wireless communication system. More specifically, the invention relates to a method and system for detecting and determining a modem type.

BACKGROUND

Wireless modems may send and receive data streams or data packets through an air interface. Wireless modems may be an analog type, such as a Bell 103 modem operating in accordance with the Bell 103 standard or other standards suitable for data communications over analog cellular voice channels. A wireless modem may be a digital type, operating in accordance with emerging standards suitable for data communications over digital cellular or PCS voice channels. Data transmissions may occur over wireless links by modulating a radio center frequency or band of frequencies in a prescribed fashion using one of a variety of modulation and encoding techniques, such as frequency modulation, frequency shift keying, phase shift modulation or frequency spreading methods, to accurately transmit and receive data through the airwaves. Once a radio communication channel is established, an incoming signal from a wireless modem may be received, amplified, demodulated and then reconstructed into data packets. An outgoing data packet may be formatted appropriately, and an outgoing transmission sent.

Transmissions of data between modems may occur over a wireless link, a wired link, a fiber link, or a combination thereof. An analog modem may operate, for example, using an analog mobile phone system such as the advanced mobile phone system (AMPS) over a band of frequencies nominally at 800 MHz. A digital modem may operate, for example, over a digital cellular or digital PCS (personal communication services) band nominally at 800 MHz, 900 MHz or 1900 MHz. An analog modem or a digital modem may operate, for example, over any suitable band of frequencies. Transmission of data over a digital wireless link using an analog modem may not work adequately due to circuitry and encoding algorithms in the mobile phone network that are optimized for voice transmissions. Data rates achievable with a digital wireless modem may be appreciably higher and more desirable than that of an analog wireless modem. Transmission of data from a digital or analog modem may occur, in part, over land-based communication lines, which may be part of a public switched telephone system.

The protocol required to transmit data streams or data packets between modems requires each modem to be operating in either an analog or digital mode. For a large number of phone calls coming into a call center, for example, it may be unknown whether an incoming data call is from an analog modem or a digital modem. Thus, the receiving end is required to determine whether an analog or a digital modem is initiating communication, and to set up the call accordingly.

A call may be initiated from a mobile vehicle, for example, to request and receive from a call center a variety of services, such as navigation instructions, directory assistance, road condition information, roadside assistance, Internet access, short messages, text messages, audio streams or video information. Many mobile vehicles are currently equipped with analog modems and switches that allow a sequence of data and voice sessions to occur. Newer vehicles may be equipped with digital modems, which offer higher speed and higher reliability in data transmissions. A call center may need, for example, to make a determination whether an incoming data call is being originated from a vehicle with an analog or a digital modem, and furthermore, to establish a connection with the mobile vehicle using the correct modem type such that the correct protocols may be used for accurate and reliable data transmission.

It is an object of this invention, therefore, to provide a method for modem protocol discrimination, and to overcome the deficiencies and obstacles described above.

SUMMARY OF THE INVENTION

One aspect of the invention provides a method of selecting a modem carrier type for data transmission over a wireless communication system. An incoming call may be received from a mobile vehicle. An initial carrier tone may be sent to a mobile vehicle in response to the incoming call. A modem response signal may be received from a vehicle modem in response to the initial carrier tone. The modem response signal may be determined to be either an analog modem response signal or a digital modem response signal, and then the call may be connected to either an analog modem or digital modem based on the modem response signal determination.

The initial carrier tone may be a nominally 2225 Hz tone. The modem response signal may be a nominally 1270 Hz tone indicating an analog vehicle modem. The modem response signal may be a connect request signal indicating a digital vehicle modem.

A call routing number associated with the incoming call may be compared to a database of call routing numbers; and the initial carrier tone may be sent when the call routing number does not match one of the call routing numbers in the database.

The initial carrier tone may be disabled upon detecting a modem response signal. The incoming call may be terminated when no modem response signal is received in response to the initial carrier tone.

Another aspect of the invention provides a wireless modem system for selecting a modem carrier type. The system may include a means for receiving an incoming call from a mobile vehicle. The system may include a means for sending an initial carrier tone to the mobile vehicle in response to the incoming call, and a means for receiving a modem response signal from a vehicle modem in response to the initial carrier tone. The system may include a means for determining whether the modem response signal is an analog modem response signal or a digital modem response signal, and a means for connecting the call to one of an analog modem or a digital modem based on the modem response signal determination.

The system may further include a means for comparing a call routing number associated with the incoming call to a database of call routing numbers; and a means for sending the initial carrier tone when the call routing number does not match with one of the call routing numbers in the database.

The system may further include a means for disabling the initial carrier tone upon detecting a modem response signal and a means for terminating the incoming call when no modem response signal is received in response to the initial carrier tone.

Another aspect of the present invention provides a computer usable medium including a program for selecting a modem carrier type.

The program may include computer program code for receiving an incoming call from a mobile vehicle. The program may include computer program code for sending an initial carrier tone to the mobile vehicle in response to the incoming call. The program may include computer program code for receiving a modem response signal from a vehicle modem in response to the initial carrier tone. The program may include computer program code for determining whether the modem response signal is an analog modem response signal or a digital modem response signal. The program may include computer program code for connecting the call to an analog modem or a digital modem based on the modem response signal determination.

The program may include program code wherein the initial carrier tone is a nominally 2225 Hz tone. The program may include program code wherein the modem response signal is a nominally 1270 Hz tone indicating an analog vehicle modem. The program may include program code wherein the modem response signal is a connect request signal indicating a digital vehicle modem.

The computer usable medium may further include computer program code for comparing a call routing number associated with the incoming call to a database of call routing numbers; and computer program code for sending the initial carrier tone when the call routing number does not match with one of the call routing numbers in the database.

The program may further include computer program code for disabling the initial carrier tone upon detecting a modem response signal. The program may include program code for terminating the incoming call when no modem response signal is received in response to the initial carrier tone.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Features and advantages of embodiments of the present disclosure will become apparent by reference to the following detailed description and drawings, in which like reference numerals correspond to similar, though not necessarily identical, components. For the sake of brevity, reference numerals or features having a previously described function may not necessarily be described in connection with other drawings in which they appear.

FIG. 3 is a flow diagram of one embodiment of a method for selecting a modem carrier type in accordance with the current invention.

DETAILED DESCRIPTION OF THE EMBODIMENTS

Figure 1:
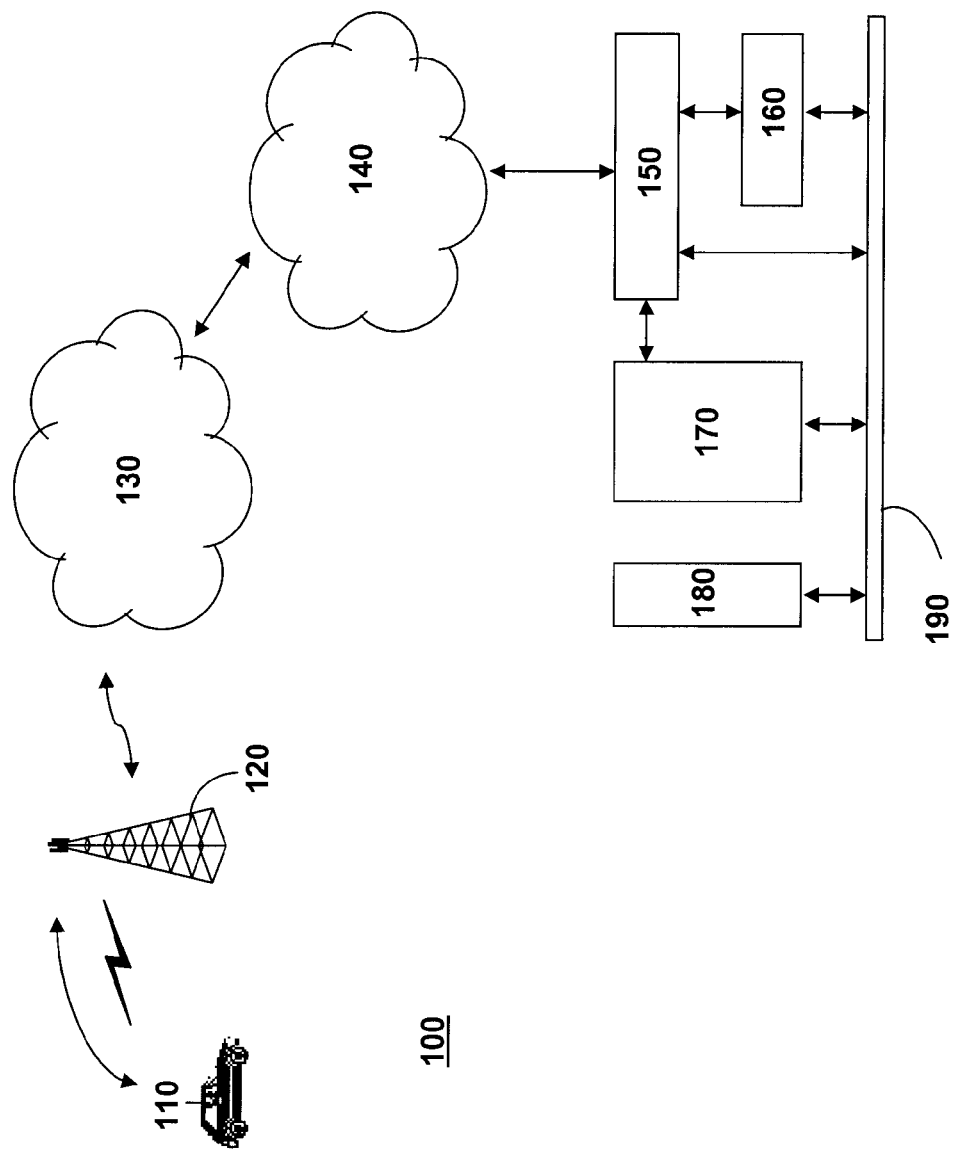
FIG. 1 is an illustration of one embodiment of a system for selecting a modem carrier type for data transmission over a wireless communication system in accordance with the current invention.

FIG. 1 shows an illustration of one embodiment of a system for selecting a modem carrier type for data transmission over a wireless communication system, in accordance with the present invention at 100.

Wireless modem protocol discrimination system 100 may include one or more mobile communication devices 110; one or more carrier systems 120; one or more wireless networks 130; one or more land networks 140; and one or more communication nodes. A communication node may contain one or more data and voice switches 150; one or more communication node modems 160; one or more advisors 170; one or more vehicle communication services managers 180, and one or more bus systems 190. A communication node may be a call center where many calls may be received and serviced at a time. Alternatively, a communication node may be a modem card in a wireless modem bank, or a computer with a modem integrated circuit, or a digital signal processor with modem capability, or a stand-alone modem, or a portable wireless communication device, or another mobile communication device 110.

Mobile communication device 110 may be a portable wireless communication device, or a mobile vehicle equipped with suitable hardware and software for transmitting and receiving voice and data communications. Mobile communication device 110 may contain a wireless modem for transmitting and receiving data. The wireless modem may be an analog modem or a digital modem. The wireless modem may reside in a digital signal processor located in the wireless communication device, a host processor, a cellular phone, or a mobile phone residing in a mobile vehicle. Mobile communication device 110 may be carried by a user or mounted in a mobile vehicle. Mobile communication device 110 may contain suitable hardware and software for transmitting and receiving voice and data communications. Mobile communication device 110 may send to and receive radio transmissions from carrier system 120.

Carrier system 120 may be a wireless communications carrier. Carrier system 120 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Carrier system 120 may transmit to and receive signals from mobile communication device 110. Carrier system 120 may transmit to and receive signals from a second mobile communication device 110. Carrier system 120 may be connected with wireless network 130.

Wireless network 130 may comprise a mobile telephone switching office. Wireless network 130 may comprise services from one or more wireless communications companies. Wireless network 130 may be any system connecting carrier system 120 to a second mobile communication device 110. Wireless network 130 may be any system connecting carrier system 120 to land network 140.

Land network 140 may be a public switched telephone network. Land network 140 may be comprised of a wired network, an optical network, a fiber network, another wireless network, or any combination thereof. Land network 140 may connect wireless network 130 with a second carrier system 120. Land network 140 may connect wireless network 130 to a communication node.

The communication node may contain a switch 150. Switch 150 may be connected to the land network 140, and may receive a modem carrier from an analog modem or from a digital modem. Switch 150 may transmit voice or data transmission from the communication node. Switch 150 may also receive voice or data transmissions from mobile vehicle 110 through carrier system 120, wireless network 130 and land network 140. Switch 150 may receive or send data transmissions with communication node modem unit 160, or receive or send voice transmissions with advisor 170.

Communication node modem unit 160 may send data to or receive data from switch 150. Communication node modem unit 160 may be an analog modem, a digital modem, or include both an analog modem and a digital modem. Communication node modem unit 160 may include the ability to detect the type of modem protocol of a received modem signal, and to establish connectivity in accordance with the modem protocol. Communication node modem unit 160 may include the ability to send a carrier tone upon receiving an incoming call, and to determine the modem type in response to a received modem signal. Communication node modem unit 160 may include the ability to determine whether the modem response signal is from an analog modem or from a digital modem. A modem may be, for example, any suitable hardware and software operating in accordance with standards Bell 103, Bell 212A, V.21, V.22, V.23, V.29, V.32, V.32bis, V.34, V.90, V.92 or any other modem standard. A wireless analog modem may be, for example, any suitable hardware and software operating in accordance with analog wireless communication standards. A wireless digital modem may be, for example, any suitable hardware and software operating in accordance with digital wireless communication standards. Communication node modem unit 160 may be a modem card. Multiple modem cards may be located, for example, in a modem bank at a call center. Communication node modem unit 160 may transfer data to or from advisor 170, vehicle communication services manager 180, or any other device connected to bus system 190. Communication node modem unit 160 may be able to distinguish between an analog modem and a digital modem used in data transmissions from mobile vehicle 110, and operate accordingly. Communication node modem unit 160 may be a located in a second mobile communication device 110.

Advisor 170 may be a real advisor or a virtual advisor. A real advisor may be a human being in verbal communication with mobile communication device 110. A virtual advisor may be a synthesized voice interface responding to requests from mobile communication device 110. Advisor 170 may provide services to mobile communication device 110. Services provided by advisor 170 may include navigation assistance, directory assistance, roadside assistance, business or residential assistance, information assistance, and emergency assistance. Advisor 170 may communicate with mobile communication device 110 using voice or data transmissions. Advisor 170 may communicate with vehicle communication services manager 180 or any other device connected to bus system 190. In cases where no data transmissions occur, advisor 170 may be connected to an incoming call through switch 150.

Vehicle communication services manager 180 may be connected to switch 150, modem 160, and advisor 170 through bus system 190. Vehicle communication services manager 180 may determine whether voice or data transmissions are to occur with mobile communication device 110. Vehicle communication services manager 180 may provide instructions to switch 150 whether a communication segment is a voice segment or a data segment. Vehicle communication services manager 180 may provide instructions to modem 160 regarding timing, protocols and signal management. Signal management may include, for example, a determination on whether the data that is being sent or received from mobile carrier 110 should be set to an analog protocol or a digital protocol, or whether an incoming call should be transferred to advisor 170. Signal management may also include establishing connectivity and terminating calls.

Figure 2:
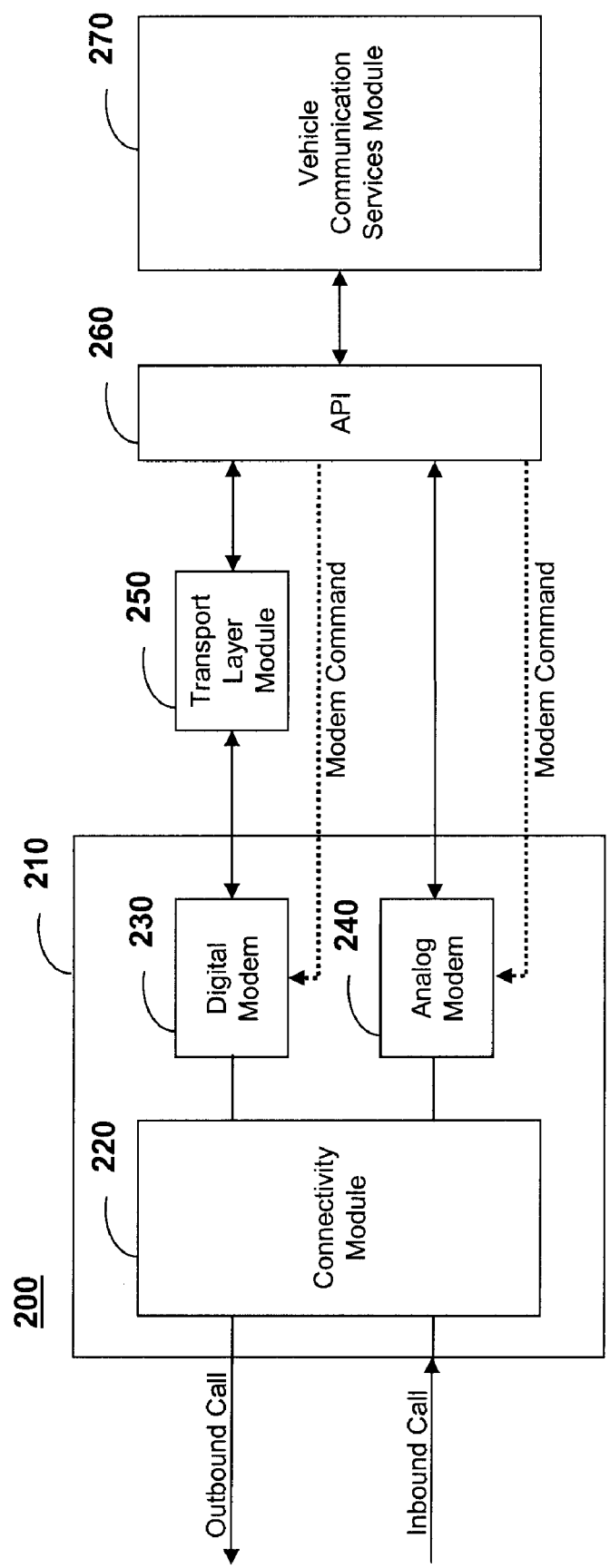
FIG. 2 is a block diagram of one embodiment of a system for selecting a modem carrier type in accordance with the current invention.

FIG. 2 shows a block diagram of one embodiment of a system for selecting a modem carrier type in accordance with the present invention at 200.

Modem carrier type selection system 200 may be comprised of one or more modem units 210. Modem unit 210 may contain a connectivity module 220, one or more digital modems 230, and one or more analog modems 240. Modem carrier type selection system 200 may comprise transport layer module 250, application programming interface (API) 260, and vehicle communication services module 270.

An inbound call may be connected to modem unit 210. Modem unit 210 may be a printed circuit board with suitable electronic circuitry and software for determining the modem carrier type of the incoming call and connecting the call to either digital modem 230 or analog modem 240. Modem unit 210 may be a digital signal processor with the ability to determine the modem carrier type of the incoming call. Modem unit 210 may be a digital signal processor with the ability to determine the modem carrier type as well as provide the functions and signals of a digital modem and an analog modem. Modem unit 210 may comprise, for example, a single chip integrated circuit encompassing connectivity module 220, digital modem 230 and analog modem 240.

Connectivity module 220 may contain suitable hardware and software for generating and sending an initial carrier tone in response to receiving an incoming call from a mobile vehicle or from a wireless modem not located in a mobile vehicle. Connectivity module 220 may contain suitable hardware and software for determining whether a modem response signal from the mobile vehicle is from an analog modem or a digital modem, and connecting the call to either digital modem 230 or analog modem 240 in modem unit 210 based on the determination.

Digital modem 230 may receive data transmissions from an appropriately connected inbound call. Digital modem 230 may send data transmissions by an appropriately connected outbound call, for example, to a digital modem in the mobile vehicle. Digital modem 230 may send and receive data transmissions on a physical layer in correspondence with layer one of the OSI (open-systems interconnection) network model. Digital modem 230 may send and receive physical layer data with transport layer module 250.

Analog modem 240 may receive data transmissions from an appropriately connected inbound call. Analog modem 240 may send data transmissions by an appropriately connected outbound call, for example, to an analog modem in the mobile vehicle. Analog modem 240 may send and receive data transmissions on a physical layer in correspondence with layer one of the OSI network model. Analog modem 240 may send and receive data with application programming interface 260.

Transport layer module 250 may contain suitable hardware and software to change physical layer data from digital modem 230 to transport layer four of the OSI network model. Transport layer module 250 may transfer data, for example, in data packets or blocks of data to application programming interface 260.

Application programming interface 260 may receive blocks of data or data packets from digital modem 230 via transport layer module 250. Application programming interface 260 may send blocks of data or data packets to digital modem 230 via transport layer module 250. Application programming interface 260 may send or receive streams of data, blocks of data or data packets with analog modem 240. Application programming interface 260 may send control signals to digital modem 230 or to analog modem 240 for the coordination of data flow and timing. Control signals generated by application programming interface 260 may include, for example, the sending of an initial carrier tone or the disabling of the initial carrier tone when a modem response signal is received. If no modem response signal is received in response to the initial carrier tone, application programming interface 260 may connect, for example, the call to advisor 170 or terminate the incoming call. Application programming interface 260 may send data to or receive data from vehicle communication services module 270.

Vehicle communication services module 270 may provide a variety of services to mobile communication device 110. Mobile communication device 110 may be mounted, for example, in a mobile vehicle. The user of the mobile vehicle may request, for example, various services to be provided such as navigation instructions, directory assistance, road condition information, roadside assistance, Internet access, short messages, text messages, audio streams or video information. Vehicle communication services module 270 may acquire and manage the information requested by the mobile vehicle. Vehicle communication services module 270 may access, for example, one or more databases, or connect with other service and information modules to provide the desired information and services.

FIG. 3 shows a flow diagram of one embodiment of a method for selecting a modem carrier type in accordance with the present invention at 300. Modem carrier type selection method 300 comprises a series of steps to determine the protocol type and to provide connectivity to a suitable modem.

An incoming call may be received (Block 305). The incoming call may be initiated, for example, by a user in a mobile vehicle desiring services such as roadside assistance, emergency services, or any of a number of information and communication services. The incoming call may be received, for example, by a call center where large numbers of incoming calls from various sources may be received. Upon reception of the incoming call, a comparison may be made of a call routing number associated with the incoming call to call routing numbers in a database. The call routing number associated with the incoming call may be the dialed number of the call center. The call routing number associated with the incoming call may be the phone number associated with the mobile vehicle. The call routing number may be obtained, for example, by use of an inbound dialed number information service (DNIS). The call routing number may be obtained, for example, from an automatic number identification (ANI) service, such as caller ID. The database of call routing numbers may contain information on whether the modem associated with the incoming call is an analog modem or a digital modem, and then connect the call to an analog modem or a digital modem accordingly.

If the comparison of the call routing number associated with the incoming call to a database of call routing numbers does not result in a match, or if no call routing number is available, a carrier tone may be generated (Block 310). The carrier tone may be, for example, a signal at a frequency of 2225 Hz. The carrier tone may be sent, for example, to the mobile vehicle. A modem located at the mobile vehicle may recognize the tone and send a modem response signal. If the modem in the mobile vehicle is an analog modem, the modem may respond with a 1270 Hz tone, for example, in accordance with Bell 103 standards. If the modem in the mobile vehicle is a digital modem, the modem may respond to the carrier tone, for example, with a connect request signal. Upon detecting a modem response signal, the initial carrier tone may be disabled.

A modem response signal may be received (Block 315). If no modem response signal is received, the incoming call may be terminated, for example, after a specified number of seconds (Block 320).

If a modem response signal is received (Block 315), a determination may be made as to whether the response is being received from an analog modem or a digital modem. If the response corresponds to a digital modem, the carrier tone may be dropped and the call may be connected, for example, to a digital modem at the call center, (Block 330). Data may then be transferred (Block 335), and the data transfer session terminated when data transfers are completed, (Block 340). Additional voice sessions and data sessions may follow, until the call is finally terminated.

If a modem response signal is received indicating an analog modem, the call may be connected to an analog modem at the call center, for example, (Block 345). Data may then be transferred (Block 350). The data transfer session may be terminated when data transfers are complete, (Block 355), or additional voice sessions and data sessions may follow until the call is finally terminated.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of selecting a modem carrier type for data transmission over a wireless communication system, comprising:
   receiving an incoming call from a mobile vehicle;
   prior to sending an initial carrier tone, obtaining a call routing number associated with the incoming call via an inbound dialed number information service or an automatic number identification service;
   sending the initial carrier tone to the mobile vehicle in response to the incoming call and in response to i) determining that the call routing number is not available or ii) determining that the call routing number does not correspond with a call routing number in a database of call routing numbers;
   receiving a modem response signal from a vehicle modem in response to the initial carrier tone;
   determining whether the modem response signal is one of an analog modem response signal or a digital modem response signal; and
   connecting the call to one of an analog modem or a digital modem based on the modem response signal determination.

2. The method of claim 1 wherein the initial carrier tone is a nominally 2225 Hz tone.

3. The method of claim 1 wherein the modem response signal is the analog modem response signal including a nominally 1270 Hz tone indicating an analog vehicle modem.

4. The method of claim 1 wherein the modem response signal is the digital modem response signal including a connect request signal indicating a digital vehicle modem.

5. The method of claim 1, further comprising disabling the initial carrier tone upon receiving the modem response signal.

6. The method as defined in claim 5 wherein the modem response signal is the digital modem response signal including a connect request signal.

7. A wireless modem system for selecting a modem carrier type, comprising:
- means for receiving an incoming call from a mobile vehicle;
- means for obtaining a call routing number associated with the incoming call via an inbound dialed number information service or an automatic number identification service;
- means for sending an initial carrier tone to the mobile vehicle in response to the incoming call, wherein the means for sending the initial carrier tone performs in response to i) determining that the call routing number is not available or ii) determining that the call routing number does not correspond with a call routing number in a database of call routing numbers;
- means for receiving a modem response signal from a vehicle modem in response to the initial carrier tone;
- means for determining whether the modem response signal is one of an analog modem response signal or a digital modem response signal; and
- means for connecting the call to one of an analog modem or a digital modem based on the modem response signal determination.

8. The system of claim 7, further comprising means for disabling the initial carrier tone upon receiving the modem response signal.

9. The computer usable medium of claim 7 wherein the initial carrier tone is a nominally 2225 Hz tone.

10. The computer usable medium of claim 7 wherein the modem response signal is the analog modem response signal including a nominally 1270 Hz tone indicating an analog vehicle modem.

11. The computer usable medium of claim 7 wherein the modem response signal is the digital modem response signal including a connect request signal indicating a digital vehicle modem.

12. A computer usable medium including a program for selecting a modem carrier type, comprising:
- computer program code for receiving an incoming call from a mobile vehicle;
- computer program code for obtaining a call routing number associated with the incoming call via an inbound dialed number information service or an automatic number identification service,
- computer program code for sending an initial carrier tone to the mobile vehicle in response to the incoming call and in response to i) determining that the call routing number is not available or ii) determining that the call routing number does not correspond with a call routing number in a database of call routing numbers;
- computer program code for receiving a modem response signal from a vehicle modem in response to the initial carrier tone;
- computer program code for determining whether the modem response signal is one of an analog modem response signal or a digital modem response signal; and
- computer program code for connecting the call to one of an analog modem or a digital modem based on the modem response signal determination.

13. The computer usable medium of claim 12, further comprising computer program code for disabling the initial carrier tone upon receiving the modem response signal.

* * * * *